Patented Jan. 30, 1945

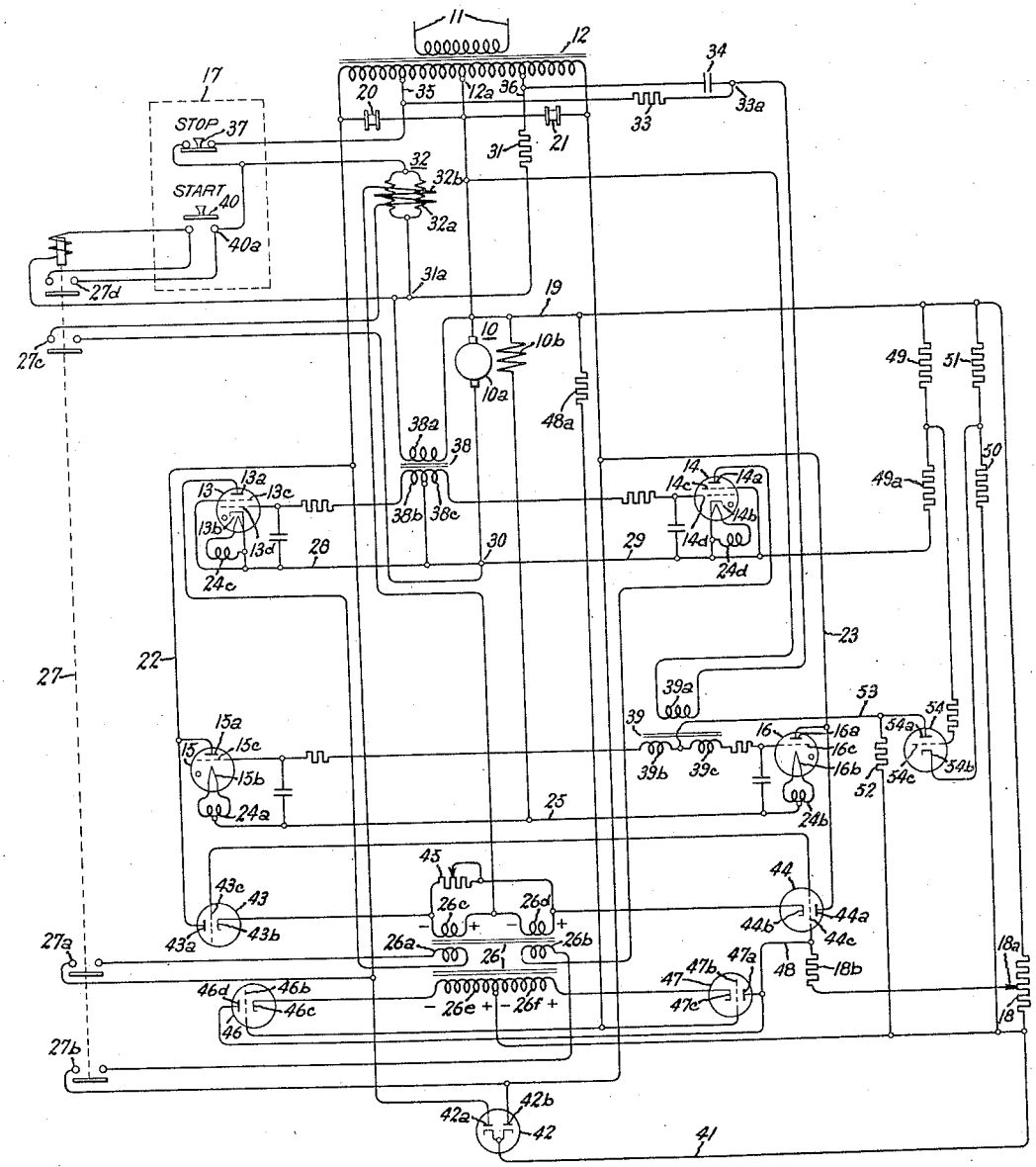

2,368,485

UNITED STATES PATENT OFFICE 2,368,485

MOTOR CONTROLLER

Elmo E. Moyer, Scotia, N. Y., assignor to General Electric Company, a corporation of New York Application December 1, 1942, Serial No. 467,501

12 Claims. (Cl. 172—288)

This invention relates to control systems, more particularly to systems for controlling the operation of electric motors, and it has for an object the provision of a simple, reliable, and improved control system of this character.

More specifically, the invention relates to systems for controlling the starting of an electric motor, and a further object of the invention is to accelerate the motor at the maximum permissible rate to a desired speed which may be preset upon a calibrated speed control device.

Another object of the invention is the provision of a control system in which the current is limited to a predetermined value thereby to accelerate the motor to the preset speed without excessive current peaks.

Another object of the invention is the provision of simplified and improved controlling circuits and apparatus for increasing the voltage supplied to the armature of the motor sufficiently to compensate for the internal voltage drop of the armature of the motor.

A further object of the invention is the provision of a wide, stepless range of operating speeds.

A still further object of the invention is the provision of a compact variable speed motor drive supplied from a source of alternating voltage in which gears, pulleys, clutches and bulky apparatus heretofore used are eliminated, and in which the objects set forth in the foregoing are achieved largely by the use of inexpensive electronic devices.

In carrying the invention into effect in one form thereof, a direct current motor is supplied through a transformer and a suitable electric valve apparatus from a source of alternating voltage. For the purpose of presetting a desired operating speed of the motor, a device which is calibrated in terms of speed produces a reference voltage corresponding in magnitude to a desired operating speed, and means are provided for producing a control voltage which is dependent upon the speed of the motor. The difference of these two voltages is applied to the cathode and control grid of a second electric valve apparatus which is connected to control the first electric valve apparatus to accelerate the motor to the desired operating speed. Also, means responsive to the anode current of the first electric valve apparatus are provided for adding a voltage in the cathode circuit of the second electric valve apparatus which controls the first electric valve apparatus to increase the voltage supplied to the motor armature sufficiently to compensate for its internal voltage drop. To limit the current supplied to the armature to a predetermined value, a third electric valve means is provided which responds to a predetermined value of current in the anode circuit of the first electric valve apparatus to apply a sufficiently negative voltage to the grid of the second electric valve apparatus.

Another feature is the provision of additional electric valve means which respond only to armature voltages which are in excess of a predetermined value for weakening the field of the motor thereby greatly to extend the speed range of the motor beyond the range which is obtainable by variation of the armature voltage.

For a better and more complete understanding of the invention, reference should now be had to the following specification and to the accompanying drawing, the single figure of which is a simple, diagrammatical illustration of an embodiment of the invention.

Referring now to the drawing, an electric motor 10 having an armature 10a and a shunt field winding 10b is supplied from a source of alternating voltage 11 through a supply transformer 12 and suitable electric valve apparatus comprising valves 13, 14, 15, and 16. The starting, stopping, and reversing of the motor 10 are under the control of a suitable controlling accessory, such as a push button station 17 and a speed controlling rheostat 18. If desired, the speed controlling rheostat 18 may be mounted on the push button station control panel.

The secondary winding of the supply transformer 12 is provided with a midtap 12a and this midtap is connected to the bus 19 which becomes the negative side of the direct current system, i. e, the negative armature terminal, the negative field terminal, and the negative control terminal.

Suitable nonlinear resistance units 20 and 21 are connected across each half of the secondary winding. These nonlinear resistances may be made of any suitable material having a nonlinear characteristic, but are preferably made of a composition of silicon carbide crystals which are held together by a suitable binder. Resistance material of this character is sold on the market under the trade name Thyrite, and is described and claimed in United States Patent 1,822,742, Karl B. McEachron, dated September 8, 1931. The purpose of these nonlinear resistances is to protect the inductive winding from high voltage surges which sometimes occur in tube circuit operations. The nonlinear resistance provides a low resistance shunt path to voltages several times higher than normal and a very high resistance path to normal voltage.

The current supplied to the field winding 10b of the motor from the source 11 is controlled by the electric valves 15 and 16. As shown, the anodes 15a and 16a of electric valves 15 and 16 are connected by means of conductors 22 and 23 to opposite terminals of the secondary winding of transformer 12. The filamentary cathodes 15b and 16b are heated by means of current supplied to the cathodes through a filament transformer, the secondary windings 24a and 24b of which are shown connected to the cathodes, and the primary windings of which are not shown in the drawing. It will be understood that the primary winding of the filament transformer may be connected to low voltage taps of the secondary winding of the supply transformer 12. These secondary windings 24a and 24b are midtapped, and the midtaps are connected to the conductor 25 which thus becomes the positive terminal of the field supply.

The supply of voltage from the source 11 to the armature 10a of the motor is controlled by means of the electric valves 13 and 14. As shown, the electric valves 13 and 14, like the electric valves 15 and 16, are connected for bi-phase rectification, i. e., their anodes 13a and 14a are connected through primary windings 26a and 26b of a special control transformer 26 and through contacts 27a and 27b of anode contactor 27 to opposite terminals of the secondary winding of the supply transformer 12. The cathodes 13b and 14b of valves 13 and 14 are provided with suitable heating units which are connected to the secondary windings 24c and 24d of a filament transformer. The cathodes 13b and 14b are connected by means of conductors 28 and 29, respectively, to the terminal 30 which thus becomes the positive side of the supply for the armature.

Although the electric valves 13, 14, 15, and 16 may be of any suitable type, they are preferably grid controlled, mercury vapor thyratron tubes. The valves 13 and 14 are provided with shield grids 13c and 14c as well as with control grids 13d and 14d, respectively. The valves 15 and 16 which control the supply of current to the field winding have directly heated filamentary cathodes and have only single grids 15c and 16c which are the control grids. In thyratron valves, the function of the control grid is only to initiate the flow of current between the anode and the cathode during each positive half-cycle of anode voltage. Once current has started to flow, the grid exercises no further control until the conductivity of the valve has been interrupted by some means external to the valve itself. Once the current has ceased to flow, the potential of the grid will again determine the point in the positive half-cycle of anode voltage at which the valve will again become conducting. These valves are therefore grid controlled arc rectifiers.

If desired, a time delay relay (not shown) may be provided to prevent the application of power to the anode circuit for an interval of time sufficient for the initial heating of the cathode of the electric valve. Also, a field protective relay (not shown) may be provided for the purpose of preventing the application of voltage to the armature of the motor until a safe field excitation has been established and for interrupting the armature circuit in the case of field failure. Time delay devices and field protective relays of this character are well understood devices and for this reason they are omitted from the drawing.

Although the thyratron valves 13 and 14 may be controlled by any suitable method, it is preferred to use the method of phase shift control of the grid voltage. For the purpose of carrying out this method of control, a phase shifting network is provided. This network comprises a resistor 31 and the alternating current winding 32a of a saturable core type reactor 32. Another phase shifting network is provided for controlling the field thyratrons 15 and 16. This network comprises a fixed resistor 33 and a capacitor 34. The phase shifting network for the field thyratrons is connected directly across the low voltage taps 35 and 36 of the supply transformer, whereas the network for the armature thyratrons 13 and 14 is connected across the low voltage taps through the normally closed contacts of the stop push button switch 37. The primary winding 38a of a grid transformer 38 is connected between the midtap 12a of transformer 12 and the junction point 31a of the resistor 31 and reactor winding 32a. This grid transformer has two secondary windings 38b and 38c. The secondary winding 38b is connected between the cathode and grid of the armature thyratron 13, and similarly, the secondary winding 38c is connected between the cathode and grid of the armature thyratron 14. A corresponding grid transformer 39 is provided for the field thyratrons 15 and 16 which has a primary winding 39a connected between the midtap 12a of transformer 12 and the junction point 33a of the resistor 33 and the capacitor 34, and a pair of secondary windings 39b and 39c which are connected in the grid circuits of the field thyratrons 15 and 16, respectively. The phase shift of the grid voltages of the armature thyratrons is produced by varying the reactance of the saturable core reactor 32, which is controlled by varying the direct current saturation of this reactor. The control is such that when the saturable reactor is saturated, the voltage of the grid transformer tends to be in phase with the anode transformer voltage and when the reactor is unsaturated, the voltage of the grid transformer tends to be out of phase and lagging. Intermediate values of saturation produce intermediate phase relationships. Thus, when the saturable reactor 32 is fully saturated, the thyratrons 13 and 14 are fully conducting and conversely, when the reactor is unsaturated, the thyratrons 13 and 14 conduct a minimum amount of current. For intermediate values of saturation, the thyratrons 13 and 14 have corresponding intermediate values of conductivity.

The push button station 17 is provided with a pair of push button type switches 40 and 37 for controlling the starting and stopping of the motor 10.

Voltage for control purposes, i. e., controlling the operation of the electric valves of the system, is supplied to a positive control voltage bus 41 by means of a double diode rectifier valve 42 whose anodes 42a and 42b are respectively connected to opposite terminals of the secondary winding of the supply transformer 12 and whose cathodes are directly connected to the positive control bus 41. Since the bus 19 is connected to the midtap 12a of the supply transformer, the bus 19 therefore serves as the negative control bus.

The saturation of the saturating winding 32b of the armature control saturable reactor is controlled by means of a pair of electric valves 43 and 44. These valves are triodes and have their anodes 43a and 44a connected to the opposite terminals of the secondary winding of the supply transformer and have their cathodes 43b and 44b connected through opposite halves 26c and 26d of the secondary winding of the special control transformer 26 to one terminal of the saturating winding 32b of the saturable reactor 32, the opposite terminal of which is connected through contact 27c to the positive terminal 30 of the motor armature 10a. The grids 43c and 44c of both valves are connected through a resistor 18b to the slider 18a of the preset speed controlling rheostat 18. Thus, the valves 43 and 44 serve to compare the armature voltage of the motor 10 with the reference voltage which is set on the speed controlling rheostat 18 and to apply the difference of these two voltages to the saturating winding 32b. In addition to serving as controllers of the current supplied to the saturating winding 32b, the valves 43 and 44 also serve to rectify this voltage which has both A. C. and D. C. components, and act to prevent a reverse current flow through winding 32b. Consequently, if the armature voltage should rise above the value of voltage preset on the speed controlling rheostat 18, the valves 43 and 44 become nonconducting and thus prevent the rise in armature voltage from saturating the saturating winding and producing a runaway condition. It will be understood that the valves 43 and 44 may be combined in a single envelope to constitute a twin triode valve.

For the purpose of accurately maintaining the speed of the motor at the level which is preset upon the speed controlling potentiometer 18, means are provided for compensating for the RI drop in the armature circuit. In effect, these means subtract an increment of voltage from the armature terminal voltage so that the resultant voltage which is used as a signal of speed is approximately equal to the countervoltage of the motor. That is to say, to hold constant armature countervoltage is to hold constant speed, and this is possible when the voltage supplied to the armature terminals is increased by an amount equal to the RI drop of the armature circuit.

The secondary windings 26c and 26d of the anode transformer 26 serve to subtract the increment of voltage from the terminal voltage of the motor. These secondary windings introduce voltages into the cathode circuit of whichever of the valves 43 or 44 is active at the instant in opposite sense to the armature voltage. Thus, during the half-cycle of anode voltages in which both the armature thyratron 13 and the valve 43 are conducting, a pulse of voltage is induced in the secondary windings 26c and 26d which produces potentials having the polarity indicated and during the succeeding half-cycle, potentials of the reverse polarity are produced. The secondary windings 26c and 26d are loaded by means of a variable resistor 45. For a given ratio between the primary windings 26a, 26b and the secondary windings 26c, 26d, the value of the loading resistance 45 determines the ratio of the secondary voltage to the primary anode current. Thus, when the motor 10 is carrying a load, the voltages of the cathodes 43b and 44b become more negative during the half-cycles in which valves 43 and 44 are conducting by an amount which is proportional to the armature current, and thus the armature terminal voltage will have to rise an equal additional amount before the grids 43c and 44c of valves 43 and 44 become sufficiently less positive or more negative than the cathodes 43b and 44b to decrease the saturating current in winding 32b and establish an equilibrium condition. It is thus seen that the average voltage from the negative armature terminal 19 to the cathodes 43b and 44b is a measure of the countervoltage of the motor which is a true measure of speed of the motor.

For the purpose of limiting the armature current to a maximum permissible value, means are provided for decreasing the voltage of the grids 43c and 44c in response to a given current signal and thereby to cause the armature voltage to be decreased. These means comprise an additional pair of triode valves 46 and 47 having their anodes 46a and 47a directly connected by means of the conductor 48 to the grids 43c and 44c of valves 43 and 44, and having their grids 46b and 47b connected to the negative control bus 19 through a grid resistor 48a and having their cathodes 46c and 47c connected through opposite halves 26e and 26f of an additional secondary winding of the transformer 26 to the positive control bus 41. During the positive half-cycle of anode voltage in which the armature thyratron 13 is conducting, voltages will be induced in the secondary windings 26e and 26f having the polarity indicated in the drawing. During the succeeding half-cycle when the armature thyratron 14 is conducting, these induced voltages in the secondary windings 26e, 26f will have the opposite polarity. Owing to the midtapped secondary windings 26e, 26f, a voltage equal to half the total secondary voltage alternately tends to decrease the voltage of cathodes 46c and 47c. However, as long as the peak value of these added voltages in the cathode circuits is less than the value of the voltage from the negative bus 19 to the positive control bus 41, the valves 46 and 47 will be nonconducting. However, when these secondary induced voltages equal or exceed the voltage across the control busses, the voltages of the cathodes 46c and 47c will alternately become more negative than the voltages of their grids and the valves 46 and 47 will be alternately conducting and will decrease the grid voltage of valves 43 and 44 by virtue of the current drawn through resistor 18b, thereby to cause the armature voltage to decrease accordingly, because the saturating winding 32b will be deenergized until the armature voltage decreases sufficiently below the voltage of the grids 43c and 44c to render the valves 43 and 44 again conducting and reenergize the saturating winding 32b.

A voltage divider comprising resistors 49 and 49a in series relationship with each other is connected across the armature 10a of the motor, and a similar voltage divider comprising resistors 50 and 51 in series relationship with each other is connected across the control voltage busses 41 and 19. The junction point of the secondary windings 39b and 39c of the grid transformer of the field thyratrons 15 and 16 is connected through a resistor 52 to the positive control voltage bus 41 and through a conductor 53, the valve 54, and resistor 51 to the negative control voltage bus 19. Thus there is applied to the grids of the field thyratrons 15 and 16 a positive direct current bias voltage by means of the valve 54 in series with a 90 degree lagging alternating current component of voltage which is induced in the secondary windings 39b and 39c by the primary winding 39a. Thus, the field control thyratrons 15 and 16 are phased "full on" until the average field voltage becomes greater than the voltage between the negative control bus 19 and the neutral point of the secondary windings 39b, 39c of the grid transformer at which point, an equilibrium condition exists. The control grid of the valve 54 is connected to the junction point between the resistors 49 and 49a which comprise the voltage divider connected across the armature 10a of the motor. When the voltage of the grid 54c of the valve 54 is more negative than the voltage of the cathode 54b, the valve 54 is nonconducting, the voltage drop across the resistor 52 is zero, and the field thyratrons 15 and 16 are phased "full on." The phase control of field thyratrons 15 and 16 by means of tube 54 is for the purpose of automatically weakening the motor field after the armature voltage has reached a predetermined value which is determined by the comparison of the ratios of resistor 49 to resistor 49a and resistor 51 to resistor 50. If the armature speed adjusting rheostat 18 is preset for a higher armature voltage, the field will be weakened and the speed increased, all under the control of the single speed adjusting rheostat 18.

With the foregoing understanding of the elements and their organization in the completed system, the operation of the system itself will readily be understood from the following detailed description:

Assuming that it is desired to operate the motor at a speed above base speed within the field weakened range, the knob of the speed controlling potentiometer is moved until the slider 18a is at a position such as indicated in the drawing. Further assuming that the primary of the supply transformer 12 is energized by connection of the primary winding to a source of supply, the field thyratrons 15 and 16 will be phased "full on" as explained in the foregoing and will be supplying maximum excitation to the field winding 10b.

To start the motor, the start push button 40 is depressed to bridge the normally open contacts 40a thereby to complete an energizing circuit for the operating coil of the anode contactor 27 from the low voltage tap 35 through normally closed contacts of the stop push button 37, contacts of the start push button 40, and operating coil of the anode contactor 27 to the opposite low voltage tap 36. In response to energization, anode contactor 27 closes its normally open contacts 27d to complete a sealing-in circuit for the coil of the contactor in parallel with the contacts of the start push button switch 40 which now may be released. Simultaneously, the anode contactor closes its main contacts 27a and 27b to complete the connections from the anodes 13a and 14a of the armature thyratrons 13 and 14 to the opposite terminals of the secondary winding of the supply transformer 12. Simultaneously, the anode contactor 27 closes its contacts 27c to complete the connections of the saturating winding 32b of the armature saturable reactor 32 to the bus 29 to which the positive terminal 30 of the armature 10a of the motor is connected. At the instant before the closing of contacts 27c, the saturable reactor 32 is fully desaturated and thus the reactance of its reactance winding 32a is maximum. The result is that the phase of the grid voltage of the armature thyratrons 13 and 14 is fully retarded and thus the armature current is allowed to build up at a time rate determined by the inductance of the direct current saturating winding 32b of the armature saturable reactor. If the grid voltage of the armature thyratrons were fully advanced when the contacts of the anode contactor were closed, the armature current for the first few cycles might be undesirably high until sufficient voltage had been built up through the anode current transformer circuit to initiate operation of the current limiting feature of the control.

As a result of the completion of the anode circuit of the armature thyratrons 13 and 14 and the energization of the direct current saturating winding 32b of the armature saturable reactor, the motor begins to accelerate to a speed determined by the setting of the speed control potentiometer 18. During acceleration, before the armature countervoltage has built up to a value corresponding to the preset speed which it is desired to maintain, the phase of the grid voltage of the armature thyratrons tends to be fully advanced and hence, the armature thyratrons tend to supply a current to the armature which is several times full load value. However, the current limiting control acting through the special control transformer 26, the valves 46 and 47, and valves 43 and 44, decreases the output of the armature thyratrons to the value determined by the relationship of the current in the primary winding of the special control transformer to the voltage induced in the secondary windings 26e and 26f. As pointed out in the foregoing, the voltage which is applied to the saturating winding 32b of the saturable reactor 32 is the difference between the terminal voltage of the motor and the reference voltage which is preset on the speed controlling potentiometer 18. Thus, as the motor accelerates, its countervoltage increases so that the difference voltage which is applied to excite the saturating winding 32b decreases.

When the basic speed of the motor is reached, the voltage drop across the resistors 49 and 49a attains a value such that with further increase in the speed of the motor the voltage of the grid 54c of valve 54 becomes sufficiently more positive or less negative to cause valve 54 to become conducting. This produces an increasing voltage drop across the resistor 52 thereby increasing the direct current negative bias component of the grid voltage of the field thyratrons 15 and 16 and retarding the phase of the grid voltage with respect to the anode voltage. This causes the field thyratrons 15 and 16 to decrease the current supplied to the field winding 10b thereby further to increase the speed of the motor. An equilibrium condition in the system is reached when the difference voltage applied to the saturating winding 32b is just sufficient to saturate the saturable reactor the amount required to cause the motor to operate at a speed corresponding to the setting of the potentiometer 18.

The voltage induced in the secondary windings 26c and 26d of the anode-current transformer 26 renders the voltages of the cathodes 43b and 44b negative by an amount proportional to the armature current of the motor. As a result, the countervoltage of the motor must rise an equal amount before the condition of equilibrium in the system is established. As a result, the control is compensated for the internal RI drop in the armature circuit.

To stop the motor, the stop push button 37 is depressed to open its normally closed contacts. The opening of the contacts of the stop push button 37 interrupts the circuit of the alternating current winding of the armature saturable reactor 32 which was previously traced through the contacts of the stop push button switch. As a result, the phase of the grid voltage of the armature thyratrons 13 and 14 is retarded, thereby rendering the armature thyratrons 13 and 14 nonconducting so that when the main contacts of the anode contactor 27 subsequently open as a result of the deenergization of their operating coils, the contacts of the anode contactor will not be required to interrupt any appreciable current. If desired, the anode contactor may be provided with normally closed contacts to complete a dynamic braking circuit through a dynamic braking resistor in parallel with the armature when the anode contactor drops out. This of course results in producing a dynamic braking torque which rapidly brakes the motor to rest.

Although in accordance with the provisions of the patent statutes this invention is described as embodied in concrete form and the principle thereof has been described, together with the best mode in which it is now contemplated applying that principle, it will be understood that the apparatus shown and described is merely illustrative and that the invention is not limited thereto, since alterations and modifications will readily suggest themselves to persons skilled in the art without departing from the true spirit of this invention or from the scope of the annexed claims.

What I claim as new and desire to secure by Letters Patent of the United States is:

1. Apparatus for controlling an electric motor having an armature winding and a field winding, means for supplying current to one of said windings, electric valve means for supplying a pulsating rectified voltage to the other of said windings, means for producing a reference voltage corresponding in magnitude to a desired operating speed of said motor, means for producing a control voltage dependent on the speed of said motor, a second electric valve means provided with an anode, a cathode, and a control grid and having its grid and cathode connected to be responsive to the difference of said control and reference voltages, means responsive to the current flowing in the anode cathode circuit of said second electric valve means to control the voltage supplied by said first electric valve means, and means responsive to the armature current of said motor for adding a voltage proportional to said armature current in the cathode circuit of said second valve means thereby to vary the voltage supplied to said other winding to compensate for the internal voltage drop of the armature of said motor comprising a transformer having its primary winding connected in the anode-cathode circuit of said first valve means and having its secondary winding connected in the anode-cathode circuit of said second valve means.

2. Apparatus for controlling an electric motor having an armature winding and a field winding, means for supplying current to one of said windings, electric valve means for supplying a pulsating direct voltage to the other of said windings, means for producing a reference voltage corresponding in magnitude to a desired operating speed of said motor, means for producing a control voltage dependent on the speed of said motor, a second electric valve means provided with an anode, a cathode, and a control grid and having its grid and cathode connected to be responsive to the difference of said control and reference voltages, means responsive to the current flowing in the anode cathode circuit of said second electric valve means to control the voltage supplied by said first electric valve means, means responsive to the armature current of said motor for adding a voltage proportional to said armature current in the cathode circuit of said second valve means thereby to vary the voltage supplied to said other winding to compensate for the internal voltage drop of the armature of said motor comprising a transformer having its primary winding connected in the anode-cathode circuit of said first valve means and having its secondary winding connected in the anode-cathode circuit of said second valve means, and means responsive to the armature current of said motor for varying the grid voltage of said second electric valve means to limit the armature current of said motor to a predetermined value.

3. Apparatus for controlling an electric motor, means for supplying current to the field winding of said motor, electric valve means for supplying a pulsating direct voltage to the armature of said motor, a source of reference control voltage, a second electric valve provided with an anode, a cathode, and a control grid and having its cathode connected to one terminal of said armature and having its grid connected to said reference voltage source so that the magnitude of the current transmitted between said anode and cathode is determined by the difference of the countervoltage of said motor and said reference voltage, means responsive to the current flowing in the anode cathode circuit of said second valve means for controlling said first valve means to control the voltage supplied to said armature, and means responsive to said armature current for adding a voltage in circuit between said armature terminal and cathode thereby to control the voltage supplied to said motor to compensate for the internal voltage drop of the armature of said motor comprising a transformer having its primary winding connected in circuit with said armature and its secondary winding connected in the anode-cathode circuit of said second electric valve.

4. Apparatus for controlling an electric motor, means for supplying current to the field winding of said motor, electric valve means for supplying a voltage to the armature of said motor, a source of reference control voltage, a second electric valve provided with an anode, a cathode, and a control grid and having its cathode connected to one terminal of said armature and having its grid connected to said reference voltage source so that the magnitude of the current transmitted between said anode and cathode is determined by the difference of the countervoltage of said motor and said reference voltage, means responsive to the current flowing in the anode cathode circuit of said second valve means for controlling said first valve means to control the voltage supplied to said armature, means responsive to said armature current for adding a voltage in circuit between said armature terminal and cathode thereby to control the voltage supplied to said motor to compensate for the internal voltage drop of the armature of said motor, and means responsive to the armature current of said motor for varying the grid voltage of said second electric valve means to limit said armature current to a predetermined value.

5. A motor controller comprising in combination, means for supplying current to the field winding of a motor, electric valve means for supplying a pulsating voltage to the armature of said motor, means for producing a reference control voltage corresponding in magnitude to the desired speed of the motor, a second electric valve provided with an anode, a cathode, and a control grid and having its cathode and grid connected to be responsive to the difference of the terminal voltage of said motor and said reference voltage for controlling the current flowing in the anode cathode circuit, means responsive to said current for controlling said first valve means to control the voltage supplied to said motor, and means responsive to the pulsating armature current of said motor for inducing a voltage in the circuit between said cathode and an armature terminal of said motor for controlling said first valve means to compensate for the interval voltage drop of said motor.

6. A motor controller comprising in combination, means for supplying current to the field winding of a motor, electric valve means for supplying a pulsating voltage to the armature of said motor, means for producing a reference control voltage corresponding in magnitude to the desired speed of the motor, a second electric valve provided with an anode, a cathode, and a control grid and having its cathode and grid connected to be responsive to the difference of the terminal voltage of said motor and said reference voltage for controlling the current flowing in the anode cathode circuit, means responsive to said current for controlling said first valve means to control the voltage supplied to said motor, means responsive to the pulsating armature current of said motor for inducing a voltage in the circuit between said cathode and an armature terminal of said motor for controlling said first valve means to compensate for the internal voltage drop of said motor, and means responsive to said armature current for controlling the grid voltage of said second electric valve means to limit said armature current to a predetermined value.

7. A motor controller comprising in combination, means for supplying current to the field of a motor, electric valve means for supplying a pulsating direct voltage to the armature of said motor, means for producing a reference voltage corresponding in magnitude to the desired speed of the motor, a second electric valve apparatus provided with an anode, a cathode, and a control grid and having its cathode and grid connected to be responsive to the difference of the countervoltage of said motor and said terminal voltage for controlling the current transmitted between said anode and cathode, means responsive to said current for controlling said first valve means to control the voltage supplied to said armature, and a current transformer having its primary winding connected in the armature circuit of said motor and a secondary winding connected in circuit between said armature and said cathode thereby to control said first valve means to compensate for the internal voltage drop of said motor.

8. A motor controller comprising in combination, means for supplying current to the field of a motor, electric valve means for supplying a pulsating direct voltage to the armature of said motor, means for producing a reference voltage corresponding in magnitude to the desired speed of the motor, a second electric valve apparatus provided with an anode, a cathode, and a control grid and having its cathode and grid connected to be responsive to the difference of the countervoltage of said motor and said terminal voltage for controlling the current transmitted between said anode and cathode, means responsive to said current for controlling said first valve means to control the voltage supplied to said armature, a current transformer having its primary winding connected in the armature circuit of said motor and a second winding connected in circuit between said armature and said cathode thereby to control said first valve means to compensate for the internal voltage drop of said motor, said transformer having an additional secondary winding and additional electric valve apparatus connected to be responsive to the voltage of said additional secondary winding to control the grid voltage of said second electric valve apparatus to limit the armature current of said motor to a predetermined value.

9. A motor controller comprising in combination, means for exciting the field of a motor, means for supplying a pulsating voltage to the armature of said motor comprising a first electric valve apparatus provided with an anode, a cathode, and a control grid, means for supplying alternating voltages to said grid and anode, a phase shifting network including a saturable core reactor provided with a saturating winding for varying the phase relationship of the grid and anode voltages of said valve to control the voltage supplied to said armature, means for producing a variable reference voltage corresponding in magnitude to the desired speed of the motor, means for supplying a variable direct current to said saturating winding to vary the speed of said motor comprising a second electric valve apparatus provided with an anode, a cathode, and a control grid and having its grid and cathode connected to be responsive to the difference of said reference voltage and the countervoltage of said motor, and means for supplying to the cathode of said second valve apparatus a voltage that is negative with respect to the voltage of its grid thereby to increase the voltage supplied to said armature to compensate for the internal voltage drop of said armature comprising a current transformer having its primary winding connected in the anode circuit of said first valve apparatus and a secondary winding connected between said armature and the cathode of said second valve apparatus.

10. A motor controller comprising in combination, means for exciting the field of a motor, means for supplying a pulsating voltage to the armature of said motor comprising a first electric valve apparatus provided with an anode, a cathode, and a control grid, means for supplying alternating voltages to said grid and anode, a phase shifting network including a saturable core reactor provided with a saturating winding for varying the phase relationship of the grid and anode voltages of said valve to control the voltage supplied to said armature, means for producing a variable reference voltage corresponding in magnitude to the desired speed of the motor, means for supplying a variable direct current to said saturating winding to vary the speed of said motor comprising a second electric valve apparatus provided with an anode, a cathode, and a control grid and having its grid and cathode connected to be responsive to the difference of said reference voltage and the countervoltage of said motor, means for supplying to the cathode of said second valve apparatus a voltage that is negative with respect to the voltage of its grid thereby to increase the voltage supplied to said armature to compensate for the internal voltage drop of said armature comprising a current transformer having its primary winding connected in the anode circuit of said first valve apparatus and a secondary winding connected between said armature and the cathode of said second valve apparatus, said transformer having an additional secondary winding and additional electric valve apparatus connected to be responsive to voltage of said additional secondary winding to control the grid voltage of said second electric valve apparatus to limit the armature current of said motor to a predetermined value.

11. A motor controller comprising in combination, electric valve apparatus for supplying a voltage to the armature of the motor, means for supplying current to the field of said motor comprising a second electric valve apparatus provided with an anode, a cathode, and a control grid, means for producing a reference voltage corresponding in magnitude to a desired value of speed of said motor, means for producing a control voltage dependent upon the speed of the motor, means responsive to the difference of said voltages for controlling said first electric valve means to control the voltage supplied to said motor, and means responsive to the speed of said motor only in excess of a predetermined value for controlling the grid voltage of said second electric valve means to decrease the current supplied to said field winding thereby further to increase the speed of said motor.

12. A motor controller comprising in combination, electric valve apparatus for supplying a voltage to the armature of the motor, means for supplying current to the field of said motor comprising a second electric valve apparatus provided with an anode, a cathode, and a control grid, means for producing a reference voltage corresponding in magnitude to a desired value of speed of said motor, means for producing a control voltage dependent upon the speed of the motor, means responsive to the difference of said voltages for controlling said first electric valve means to control the voltage supplied to said motor, and means responsive to the terminal voltage of said motor in excess of a predetermined value for controlling the voltage of said grid to decrease the current supplied to said field winding thereby further to increase the speed of said motor.

ELMO E. MOYER.

CERTIFICATE OF CORRECTION.

Patent No. 2,368,485.   January 30, 1945.

ELMO E. MOYER.

It is hereby certified that error appears in the printed specification of the above numbered patent requiring correction as follows: Page 6, first column, line 21, for "interval" read --internal--; and second column, line 11, for "second" read --secondary--; and that the said Letters Patent should be read with this correction therein that the same may conform to the record of the case in the Patent Office.

Signed and sealed this 15th day of May, A. D. 1945.

Leslie Frazer (Seal)   Acting Commissioner of Patents.